US009620266B2

(12) United States Patent
Ortner et al.

(10) Patent No.: US 9,620,266 B2
(45) Date of Patent: Apr. 11, 2017

(54) ELECTRICAL DEVICE

(75) Inventors: Markus Ortner, Graz (AT); Michael Schossmann, Deutschlandsberg (AT); Markus Koini, Seiersberg (AT); Günter Engel, Leibnitz (AT); Christian Hoffmann, Narita (JP)

(73) Assignee: EPCOS AG (DE)

( * ) Notice: Subject to any disclaimer, the term of this patent is extended or adjusted under 35 U.S.C. 154(b) by 177 days.

(21) Appl. No.: 14/131,559

(22) PCT Filed: Jul. 4, 2012

(86) PCT No.: PCT/EP2012/063037
§ 371 (c)(1),
(2), (4) Date: Apr. 2, 2014

(87) PCT Pub. No.: WO2013/007575
PCT Pub. Date: Jan. 17, 2013

(65) Prior Publication Data
US 2014/0204503 A1 Jul. 24, 2014

(30) Foreign Application Priority Data
Jul. 13, 2011 (DE) .................. 10 2011 107 193

(51) Int. Cl.
*H01G 4/232* (2006.01)
*H01C 1/148* (2006.01)
(Continued)

(52) U.S. Cl.
CPC ............. *H01C 1/148* (2013.01); *H01C 1/01* (2013.01); *H01C 7/02* (2013.01); *H01C 7/04* (2013.01);
(Continued)

(58) Field of Classification Search
None
See application file for complete search history.

(56) References Cited

U.S. PATENT DOCUMENTS 4,089,041 A 5/1978 Lockard
4,734,819 A 3/1988 Hernandez et al.
(Continued)

FOREIGN PATENT DOCUMENTS

CH 607547 7/1976
CN 1532860 9/2004
(Continued)

OTHER PUBLICATIONS

Johann W. Kolar, et al., "Automotive Power Electronics—ECPE Research Roadmap Initiative," Institut Integrierte Systeme and Bauelementetechnologie, pp. 1-17.
(Continued)

*Primary Examiner* — Dion R Ferguson
(74) *Attorney, Agent, or Firm* — DLA Piper LLP (US)

(57) ABSTRACT

An electrical device having at least one functional element that includes a ceramic body, on which a first electrical contact layer and a second electrical contact layer are applied to two opposite-lying side faces, respectively, and the functional element is arranged between a first contact strip and a second contact strip, wherein the first contact strip and the second contact strip comprise several contact pins, respectively, and wherein the first contact layer electrically contacts at least one contact pin of the first contact strip and the second contact layer electrically contacts at least one contact pin of the second contact strip.

15 Claims, 6 Drawing Sheets

(51) Int. Cl.
| | |
|---|---|
| *H01C 1/01* | (2006.01) |
| *H01C 7/02* | (2006.01) |
| *H01C 7/04* | (2006.01) |
| *H01C 7/10* | (2006.01) |
| *H01G 4/248* | (2006.01) |
| *H01G 4/30* | (2006.01) |
| *H01C 7/00* | (2006.01) |
| *H01G 2/06* | (2006.01) |

(52) U.S. Cl.
   CPC ............... *H01C 7/10* (2013.01); *H01G 4/232* (2013.01); *H01G 4/248* (2013.01); *H01G 4/30* (2013.01); *H01C 7/008* (2013.01); *H01G 2/06* (2013.01)

(56) References Cited

U.S. PATENT DOCUMENTS

| | | | | |
|---|---|---|---|---|
| 6,356,431 | B1* | 3/2002 | Lin | ............. H01G 2/06 361/301.3 |
| 6,400,551 | B1* | 6/2002 | Lin | ............. H01G 2/06 361/301.3 |
| 6,473,291 | B1* | 10/2002 | Stevenson | ............. H01G 4/228 361/301.4 |
| 6,958,899 | B2 | 10/2005 | Togashi et al. | |
| 7,781,358 | B2 | 8/2010 | Hackenberger et al. | |
| 7,880,582 | B2 | 2/2011 | Tepper et al. | |
| 8,649,158 | B2* | 2/2014 | Herrmann | ............. H01G 2/04 361/306.1 |
| 2009/0147440 | A1* | 6/2009 | Cygan | ............. H01G 4/232 361/306.3 |

FOREIGN PATENT DOCUMENTS

| | | |
|---|---|---|
| CN | 101553888 | 10/2009 |
| CN | 201584295 | 9/2010 |
| EP | 0018067 | 10/1980 |
| EP | 0028423 | 4/1984 |
| EP | 1011117 | 6/2000 |
| GB | 2 324 648 | 10/1998 |
| JP | 57-64137 | 4/1982 |
| JP | 5-13232 | 1/1993 |
| JP | 07-193400 | 7/1995 |
| JP | 7-320849 | 12/1995 |
| JP | 2011-40684 | 2/2011 |
| WO | 2006/022257 | 3/2006 |
| WO | WO2010040343 | * 4/2010 ............. H01G 4/228 |
| WO | 2011/005378 | 1/2011 |

OTHER PUBLICATIONS

Chen, E. et al;, "Ripple Current Confusion," KEMET Corporation, Sep. 2004.
Clelland, I. et al., "Recent Advances in Capacitor Technology with Application to High Frequency Power Electronics and Voltage Conversion," ITW Paktron, Technical Bulletin 3.99A, 1999.
Engel, G. et al., "Effective Reduction of Leakage Failure Mode after Flet Cracking Events in X7R-type Multilayer Ceramic Capacitors (MLCCs) by using Internal Series Connection (MLSCs)," CARTS Europe 2006 Proceedings.
Kageyama, T., "Murata's Ceramic Capacitor Serves Next Series of Power Electronics," AEI, Apr. 2007, pp. 31-32.
Kubota, K. et al., "Ceramic Capacitors Aid High-Voltage Designs," Power Electronics Technology, May 2004.
Lessner, P. et al., "Technical Update-Explanation of Ripple Current Capabilities," KEMET Corporation, Aug. 2004.
Vetter, H., "Mission Profile Based PCC Design for Integration into HEV Converter," Capacitor and Resistor Technology Symposium (CARTS),ASIA 2006, Oct. 9-13, 2006, Sawyer, E., "Low Inductance—Low Temperature Rise DC Bus Capacitor Properties Enabling the Optimization of High Power Inverters," International Power Electronics Conference 2010, May 4-6, 2010.
Schuler, S. "Schnell geschaltet—das Schaltverhalten moderner IGBT optimieren," Elektronik Journal Nov. 2010, Seite 30, Abstract, TDK, "Mega Cap CKG Series".
Tsurumi T. et al., "Size Effect of Barium Titanate and Computer-Aided Design of Multilayered Ceramic Capacitors," IEEE Transactions on Ultrasonics, Ferroelectrics, and Frequency Control, vol. 56, No. 8, Aug. 2009.

* cited by examiner

Fig. 1a
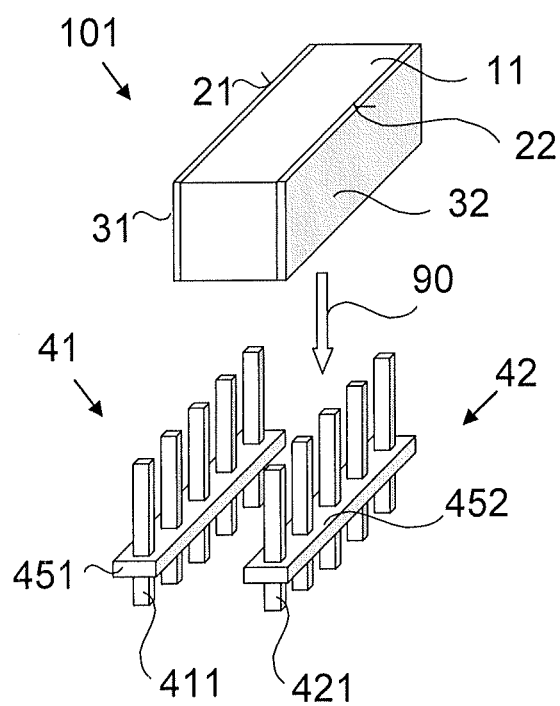
Fig. 1b
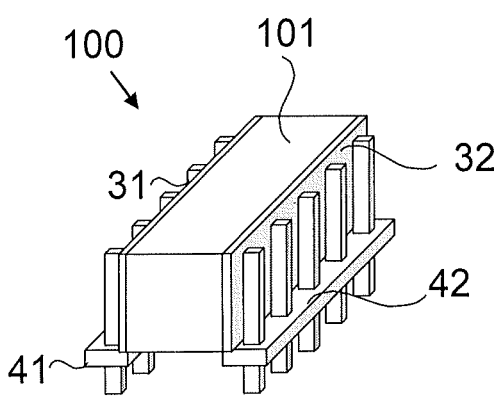
Fig. 2a
Fig. 2b
Fig. 2c
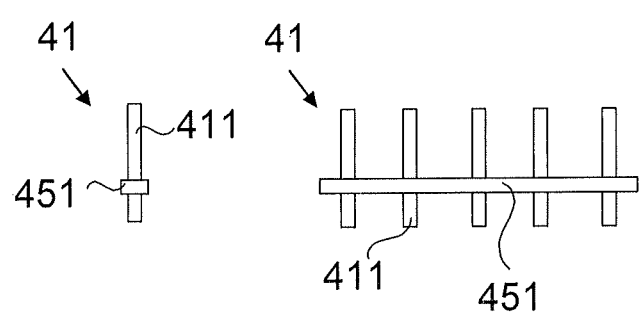

ELECTRICAL DEVICE

TECHNICAL FIELD

This disclosure relates to an electrical device.

BACKGROUND

Electrical devices are known that are, for example, capacitors such as, for example, electrolytic capacitors, film capacitors or ceramic capacitors, or as thermistors, for example, PTC thermistors or NTC thermistors, or as varistors. An electrical and mechanical contact between electrical devices of this type and an electronic circuit board (PCB—printed circuit board) is produced as standard by soldering in the case of so-called "surface mounted devices" (SMD). However, as the size of electrical devices increases, problems arise as a result of the soldering process. By way of example, a so-called "solder shock" can occur that as a result of the soldering process leads to thermally induced mechanical loadings. These loadings can subsequently lead to a malfunction of a device of this type.

There is thus a need to provide an improved electrical device.

SUMMARY

We provide an electrical device having at least one functional element that includes a ceramic body, on which a first electrical contact layer and a second electrical contact layer are applied to two opposite-lying side faces, respectively, and said functional element is arranged between a first contact strip and a second contact strip, wherein the first contact strip and the second contact strip comprise several contact pins respectively, and wherein the first contact layer electrically contacts at least one contact pin of the first contact strip and the second contact layer is in electrical contact with at least one contact pin of the second contact strip.

BRIEF DESCRIPTION OF THE DRAWINGS

FIGS. 1a and 1b illustrate a method of producing an electrical device in accordance with an example.

FIGS. 2a to 2c illustrate different views of a contact strip in accordance with a further example.

LIST OF REFERENCE NUMERALS

Figure 3A:
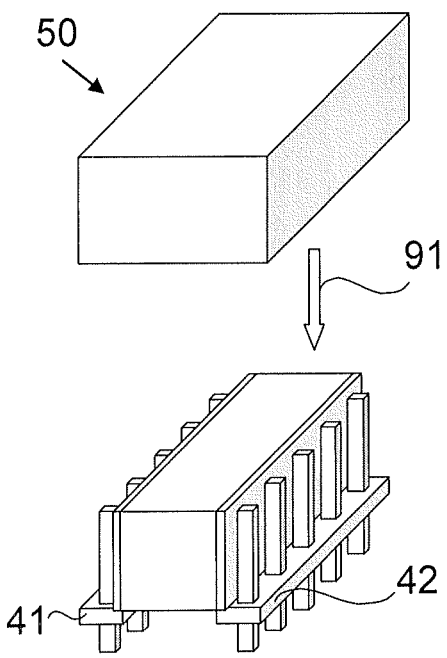
FIGS. 3a to 3c illustrate a method of producing an electrical device in accordance with a further example.

101, 102 Functional element
11 Ceramic body
21, 22 Side faces
31 First electrical contact layer
32 Second electrical contact layer
41 First contact strip
42 Second contact strip
43 Third contact strip
411, 421, 431 Contact pin
451, 452 Support strip
50 Cap
501, 502 Inner face
511, 512 Inclined regions
90, 91, 92 Arrow
100, 200, 300, 400 Electrical device
500, 600, 700, 800 Electrical device Our electrical device may comprise at least one functional element.

The functional element may comprise a ceramic body. The ceramic body can behave in a dielectric manner. The functional element can be by way of example a capacitor element. Furthermore, the ceramic body can also have semi-conducting properties. Furthermore, the ceramic body can be by way of example a thermistor element, possibly as an NTC thermistor element or as a PTC thermistor element or as a varistor element.

Preferably, the at least one functional element is a capacitor element, wherein the ceramic body of the capacitor element can comprise a layer stack having ceramic layers arranged one on top of another and first and second electrode layers arranged between the ceramic layers. The ceramic layers can comprise, for example, lead zirconate titanate. The electrode layers can comprise by way of example silver, palladium and/or platinum. The electrode layers extend preferably from two opposite-lying side faces of the ceramic body into the layer stack. Furthermore, additional electrode layers can also be arranged in the interior of the ceramic body, which electrode layers do not extend to any of the side faces of the ceramic body.

Preferably, the ceramic body comprises two opposite-lying side faces, wherein a first electrical contact layer is applied to one side face of the two opposite-lying side faces and a second electrical contact layer is applied to the other side face. The first electrical contact layer and the second electrical contact layer can comprise one or several individual layers, by way of example one or several metal layers that can comprise, for example, chrome, copper and/or gold. If the at least one functional element is a capacitor element having first and second electrode layers in the ceramic body, then the first electrode layers can contact the first electrical contact layer and the second electrode layers can contact the second electrical contact layer.

The functional element may be arranged between a first contact strip and a second contact strip. The first contact strip and the second contact strip each comprise at least one contact pin. The first contact strip and the second contact strip can preferably each comprise several contact pins. On the one hand, the use of several contact pins per contact strip can improve lead inductance that occurs between a printed circuit board and a contact layer of the functional element and, on the other hand, the current carrying capacity can be increased and the current uniformly distributed from the contact layer to inner electrodes that are provided in the interior of the ceramic body in at least some examples.

The contact pins may be electrically conductive pins. It is preferred that the contact pins comprise a metal or are from metal. Each of the contact pins can comprise by way of example an elongated pin-shaped or rod-shaped body. The cross section perpendicular to the longitudinal axis of the pin-shaped body can be round, by way of example circular, or rectangular, by way of example square.

The first contact layer of the functional element may be in electrical contact with at least one contact pin of the first contact strip. It is preferred that the second contact layer of the functional element is in electrical contact with at least one contact pin of the second contact strip. The contact pins of the contact strips can be suitable in particular for the purpose of contacting the functional element. In particular, the functional element can be arranged between the contact strips such that the first electrical contact layer of the functional element faces the first contact strip and the second electrical contact layer of the functional element faces the second contact strip. The contact pins of the contact strips can directly contact the respective facing electrical contact layer of the functional element. Furthermore, at least one or several intermediate layers can also be provided between the contact pins and the respective facing electrical contact layer of the functional element.

A functional element is provided in a method of producing an electrical device, which functional element comprises a ceramic body, on which a first electrical contact layer and a second electrical contact layer are applied to two opposite-lying side faces, and in an additional method step are arranged between a first contact strip and a second contact strip so that each of the contact strips is in electrical contact with in each case one contact layer of the functional element.

The features described here and hereinunder apply likewise to the electrical device and methods of producing the device.

The electrical device may comprise a cap arranged over the functional element and the contact strips. The cap can comprise by way of example a square profile, wherein a side face of the cuboid has a recessed region. This recessed side face can also be described here and hereinunder as an opening of the cap. It is preferred that the cap comprises an electrically insulating material, by way of example a plastic material.

The cap arranged over the functional element and the contact strips may be in direct contact with both contact strips. The cap may be in direct mechanical contact with both contact strips. Consequently, it is possible to produce an electrical contact with the functional element by way of the contact strips in combination with the cap.

It can be advantageously achieved by way of a construction described here that the electrical device is not damaged by way of thermally induced mechanical loadings that occur by way of example as a result of a solder shock.

The functional element may be clamped between the first contact strip and the second contact strip by way of the cap. Mechanical contact between the contact strips and the functional element can be achieved by way of this clamping arrangement provided by the cap. The cap can therefore also be described here and hereinunder as a clamping cap.

Each of the contact strips may comprise a support strip in which the contact pins are fastened. The support strips can comprise, by way of example, an elongated, cuboid shaped body. Furthermore, the support strips can comprise metal and/or plastic material. The contact pins preferably protrude through the respective support strip and are preferably installed in the support strip that they extend beyond two opposite-lying sides of the support strip and protrude on both sides of the support strip. Furthermore, the contact pins are preferably arranged in the respective support strip in a uniformly spaced manner. As a consequence, the contact strips that comprise the support strips and contact pins can be in the shape of a fence.

The cap covers the functional element and the support strips of the contact strips. The contact pins can at least partially protrude from the space covered by the cap, in particular from the opening of the cap.

The cap may comprise inclined regions on two opposite-lying inner sides. These inclined regions extend preferably along the two opposite-lying inner sides and the inclined regions can by way of example be produced by virtue of the fact that the cap comprises on these inner sides in regions that border the opening a thinner wall than in regions remote from the opening. It is preferred that the support strips are arranged in the inclined regions. A particularly efficient arrangement of clamping the functional element and the contact strips can be achieved by the inclined regions of the cap.

In particular, the pins can be clamped to the contact layers by the cap. The pins can be mechanically prestressed and act in a spring like manner. As a consequence, by way of example, any axial length changes that occur can be accommodated. These axial length changes arise, for example, as a result of a change in temperature in the device. Furthermore, it can be advantageously achieved that vertical loading on the contact strips does not lead to a shearing stress or a bending stress on the device.

The device may comprise several functional elements arranged between the first contact strip and the second contact strip. The different functional elements can be identical. However, it is also possible that the individual functional elements differ from one another with respect to their construction and/or their function.

At least two of the functional elements may be arranged next to one another along the first contact strip and the second contact strip. In the case of a construction of this type, the functional elements arranged next to one another along the contact strips are both contacted by the contact pins of the first contact strip and the second contact strip.

At least two of the functional elements are arranged one on top of the other along the contact pins. It is preferred that the contact pins can contact all of the functional elements arranged one on top of the other. By way of example, the contact pins can comprise a length that renders it possible for the contact pins to contact two functional elements lying one on top of the other.

At least one functional element may precisely contact one contact pin of the first contact strip and one contact pin of the second contact strip. It is also possible that all functional elements of the electrical device are each contacted precisely one contact pin of the first contact strip and precisely one contact pin of the second contact strip.

At least one additional functional element and a third contact strip may be provided. It is preferred that the further functional element is arranged between the second contact strip and the third contact strip. The contact pins of the second contact strip can be in direct electrical contact both with the functional element arranged between the first contact strip and the second contact strip and also with the functional element arranged between the second contact strip and third contact strip.

All of the functional elements of the electrical device may be capacitor elements, by way of example as is described above. The number of functional elements in the electrical device can be adjusted depending upon the requirements of the electrical device. The device thus comprises by way of example several capacitor elements if a large capacity is to be achieved.

At least one functional element may be a varistor element. By way of example, the electrical device can comprise several functional elements that are capacitor elements, and a varistor element integrated in a low inductance manner.

The at least one functional element and the contact pins of the contact strips or, in the case of several functional elements, all functional elements arranged in one plane and the contact pins of the contact strips can be bound together by a film or a film band. As a consequence, the at least one functional element or several functional elements located in one plane and the contact elements can be held together in a simple manner. A clamping effect can be achieved by way of the film or film band as described above in conjunction with the cap.

The examples of electrical devices described here are characterized in particular by virtue of a cost-effective construction, highly reliable operating characteristics and by a very high current carrying capacity. Furthermore, the devices described here can render possible a very low inductance connection at least in some embodiments.

Further advantages of the devices described here are evident in the examples described hereinunder in conjunction with FIGS. 1a to 7b.

Like or like-functioning components in the examples and figures can be provided in each case with like reference numerals. The illustrated elements and their proportions with respect to one another are fundamentally not to be regarded as true to scale, but rather individual elements such as, for example, layers, components and regions can be illustrated with an exaggerated width or large dimensions for ease of illustration or to facilitate better understanding.

FIGS. 1a and 1b illustrate an example of a method of producing an electrical device.

In a first method step, a functional element is provided for this purpose, as is illustrated in FIG. 1a, which functional element is arranged between a first contact strip 41 and a second contact strip 42 in an additional method step that is indicated by an arrow 90.

The functional element 101 comprises a cuboid ceramic body 11 that is capacitor element in the illustrated example and comprises a ceramic part made from lead zirconate titanate. Alternatively, the functional element 101 can also comprise a different ceramic material or, by way of example, can also be a varistor element or thermistor element and comprise a ceramic body made from a corresponding different ceramic material suitable for this purpose.

The ceramic material of the ceramic body 11 comprises ceramic layers, between which ceramic layers first and second electrode layers are arranged (not illustrated).

The ceramic body 11 further comprises a side face 21 to which a first electrical contact layer 31 is applied. Furthermore, the ceramic body 11 comprises a side face 22 that lies opposite the side face 21, to which side face 22 a second electrical contact layer 32 is applied. The first contact layer 31 and the second contact layer 32 electrically connect to the first or second electrode layers respectively in the interior of the ceramic body 11 and are used to electrically contact the electrode layers.

The first contact strip 41 and the second contact strip 42 comprise a support strip 451, 452 respectively. Furthermore, the first contact strip 41 and the second contact strip 42 comprise several contact pins 411, 421 respectively that are fastened in the support strips 451, 452 by virtue of the fact that the contact pins 411, 421 protrude through the respective support strip 451, 452. The contact strips 41, 42 are identical in the illustrated example. Alternatively, the contact strips 41, 42 can also differ from one another, by way of example, with respect to their length and/or with respect to the number of their contact pins 411, 412.

The contact strip 41 is illustrated by way of example in a front view, in a side view and in a plan view in FIGS. 2a to 2c. The contact pins 411 are electrically conductive, rod-shaped pins that each protrude from both sides of the support strip 451. In the illustrated example, contact pins 411 of the contact strip 41 adjacent to one another are uniformly spaced with respect to one another. Alternatively, the contact pins 411, 412 adjacent to one another can also be spaced differently with respect to one another.

Once the functional element 101 has been installed between the contact strips 41, 42, in the electrical device 100 that is produced in this manner, as is illustrated in FIG. 1b, the first contact layer 31 faces the first contact strip 41 and the second contact layer 32 faces the second contact layer 42 and the two contact layers 31, 32 are in electrical contact with the respective contact strip 41, 42. This can be a direct pressure contact between the contact layers 31, 32 and the respective contact pins 411, 421, as in the illustrated example. As an alternative thereto, it is also possible for this purpose that one or several additional electrically conductive intermediate layers are provided between the functional element 101 and the contact strips 41, 42. Furthermore, a film or a film band (not illustrated) can be wound around the functional element 101 and the contact pins 411, 421 of the contact strips 41, 42 to fix the contact strips 41, 42 and the functional element to one another.

Figure 3B:
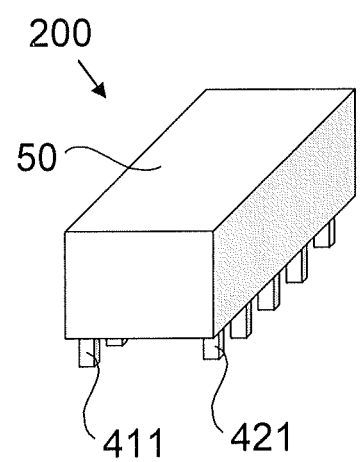
Figure 3C:
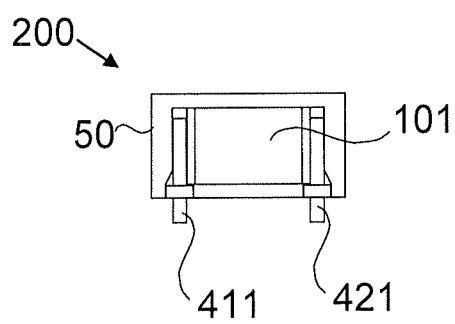

A further example of a method of producing an additional electrical device 200 is illustrated in FIGS. 3a to 3c.

In one method step for this purpose, a functional element 101 is arranged between two contact strips 41, 42, as is described in conjunction with FIGS. 1a and 1b.

As is illustrated in FIG. 3a, a cap 50 is additionally provided, which cap is arranged over the functional element 101 and the contact strips 41, 42 in an additional method step indicated by the arrow 91. As a consequence, it can be advantageously achieved that the functional element 101 is clamped between the first contact strip 41 and the second contact strip 42 by way of the cap 50. This clamping arrangement renders it possible to simultaneously achieve a good mechanical and electrical contact between the contact strips 41, 42 and the functional element 101.

The electrical device 200 produced in this manner is illustrated in FIG. 3b with the cap 50 in place. It is evident that the contact pins 411, 412 at least partially protrude from the open side of the cap 50. In the case of an arrangement of this type, axial forces that arise and act on the device 100 and/or on the functional element 101 only exert pressure on the ceramic body 11. Advantageously, tangential, vertical and tensile forces do not occur. Bending forces act on the contact pins 411, 421 only as axial forces.

Figure 4A:
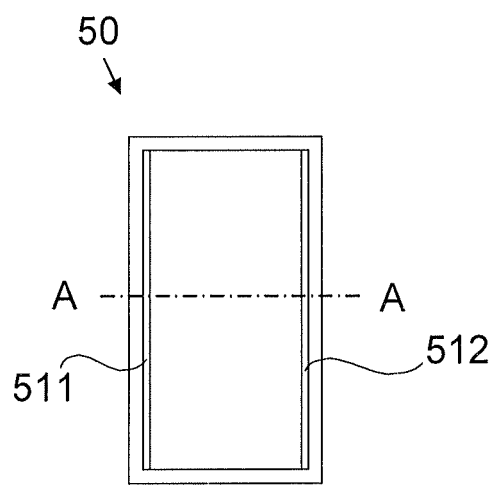
FIGS. 4a to 4c illustrate different views of a cap in accordance with a further example.
Figure 4B:
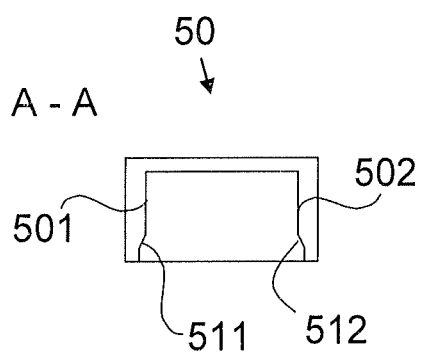
Figure 4C:
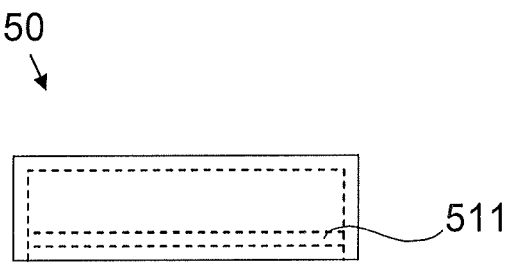

The cap 50 is illustrated in different views in FIGS. 4a to 4c, and indeed in a view from below, in other words from the opening of the cap 50, in a sectional view in the section plane A-A that is illustrated in FIG. 4a, and in a side view. The cap 50 comprises inclined regions 511, 512 on two opposite-lying inner sides 501, 502, which inclined regions border the opening of the cap and are produced by virtue of the fact that the cap comprises in these regions a thinner wall than in regions that border the inclined regions.

FIG. 3c illustrates a sectional view of the electrical device 200 shown in FIG. 3b in which it is evident that the support strips 451, 452 of the contact strips 41, 42 are arranged in the inclined regions 511, 512 of the inner sides 501, 502 of the cap 50. The contact pins 411, 421 are clamped to the contact layers 31, 32 by the inclined regions 511, 512. The contact pins 411, 421 are in particular mechanically prestressed. As a consequence, axial length changes can be accommodated, which changes arise, for example, as a result of temperature changes. Vertical loading on the contact strip does not lead to a shearing stress or bending stress on the functional element 101 and/or on the device 200.

Figure 5A:
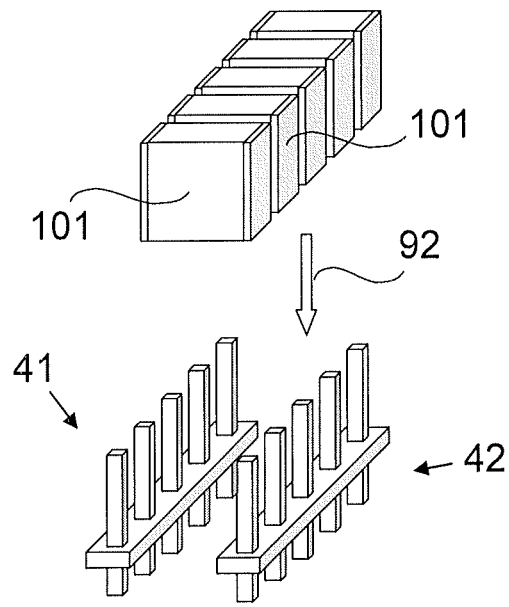
FIGS. 5a to 7b illustrate electrical devices in accordance with further examples.
Figure 5B:
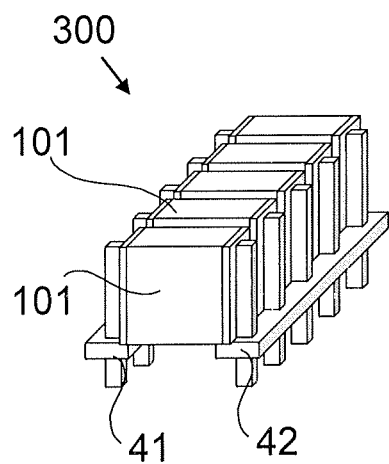

An example of a method of producing an electrical device 300 is illustrated in FIGS. 5a and 5b, in which method the device 200, in comparison to the method illustrated in FIGS. 1a and 1b, comprises several functional elements 101 that are arranged next to one another along the first contact strip 41 and the second contact strip 42.

For this purpose, in a method step indicated by the arrow 92, individual functional elements 101 that are arranged in rows next to one another are arranged between the two contact strips 41, 42 that are provided. In the illustrated example, each of the functional elements 101 is contacted by a contact pin 411 of the first contact strip 41 and by a contact pin 421 of the second contact strip 42. Alternatively, it is also possible that one or several functional elements 101 are contacted by several contact pins 411, 421 of the first contact strip 41 and/or the second contact strip 42.

Figure 5C:
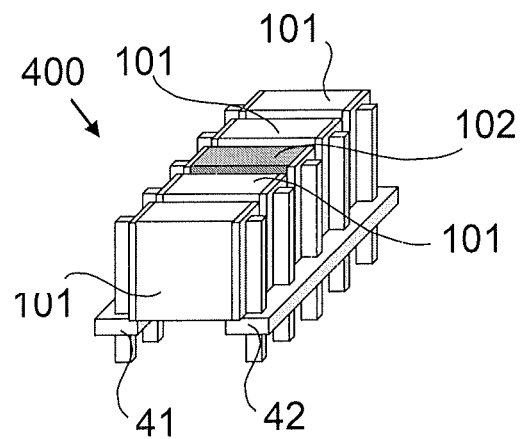

An example for an electrical device 400 is illustrated in FIG. 5c, wherein, in contrast to the electrical device 300 in FIG. 5b, at least one functional element 102 is provided, which functional element is a varistor element. All additional functional elements 101 are capacitor elements as in the previous examples. Alternatively, it is also feasible that two or more of the functional elements of the electrical device 400 are varistor elements.

The electrical devices 300 and 400 illustrated in FIGS. 5b and 5c can furthermore also comprise a film winding as described in conjunction with FIG. 1b and/or a cap as illustrated in conjunction with FIGS. 3a to 4c.

Further examples for electrical devices are illustrated in FIGS. 6a to 7b, which in each case comprise several functional elements in rows arranged next to one another and/or one on top of the other. The production method in accordance with the previously described examples can if expanded accordingly also be used to produce the examples described hereinunder. Furthermore, the electrical devices in accordance with FIGS. 6a to 7b can also comprise a film winding, as described in conjunction with FIG. 1b, and/or a cap as is illustrated in conjunction with FIGS. 3a to 4c, which film winding and/or cap render(s) it possible to fix the several functional elements and the contact strips to one another and also, by way of example, to produce a clamping contact.

Figure 6A:
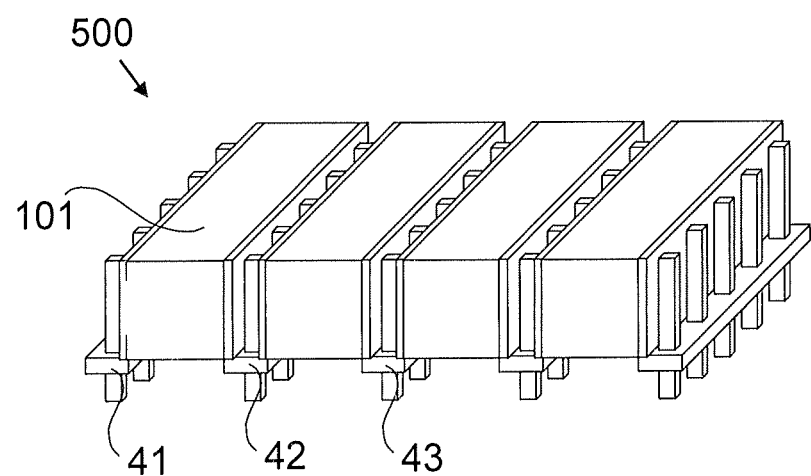

FIG. 6a illustrates an electrical device 500 that comprises additional contact strips 43, wherein in each case functional elements 101 are arranged in rows between the contact strips 41, 42, 43.

Figure 6B:
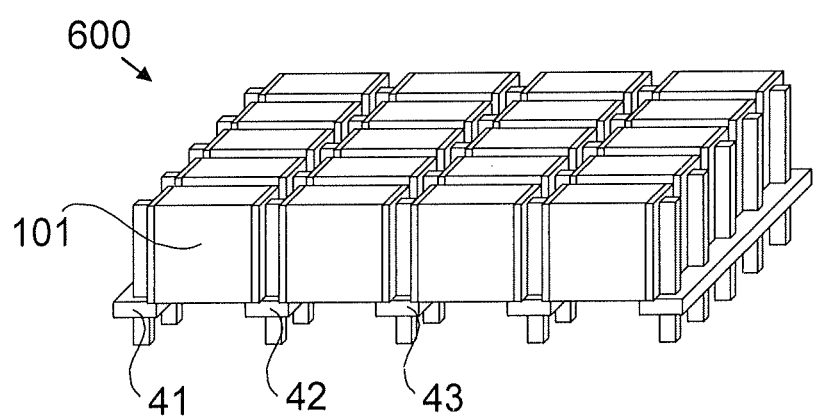

FIG. 6b illustrates an electrical device 600 that comprises several contact strips 41, 42, 43 and several functional elements 101, wherein the several functional elements 101 are arranged both along the contact strips 41, 42, 43 and also in rows between two of the contact strips 41, 42, 43 respectively. In particular, in the illustrated example, each functional element 101 is contacted by precisely two contact pins 411, 421 of two different contact strips 41, 42, 43.

Figure 7A:
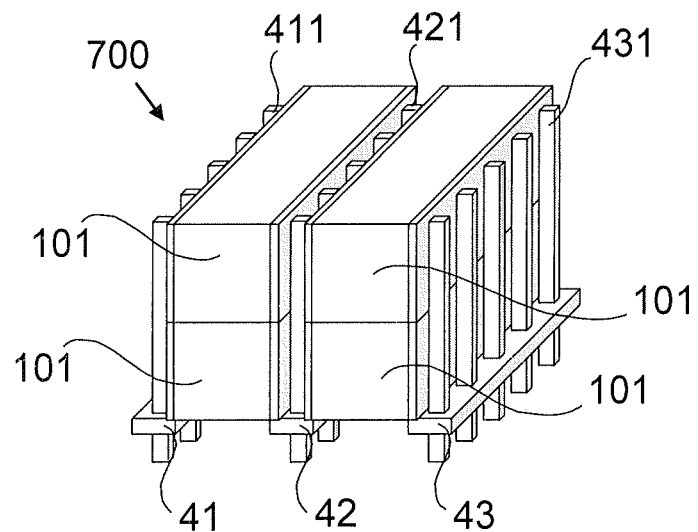

A further example of an electrical device 700 is illustrated in FIG. 7a. The device 700 comprises several functional elements 101, wherein in each case two functional elements 101 are arranged one on top of the other along the contact pins 411, 421, 431 of the contact strips 41, 42, 43. The contact pins 411, 421, 431 are longer in comparison to the previously described examples so that all of the functional elements 101 arranged one on top of the other can be contacted. As an alternative to the illustrated examples, more than two functional elements 101 can also be arranged one on top of the other.

Figure 7B:
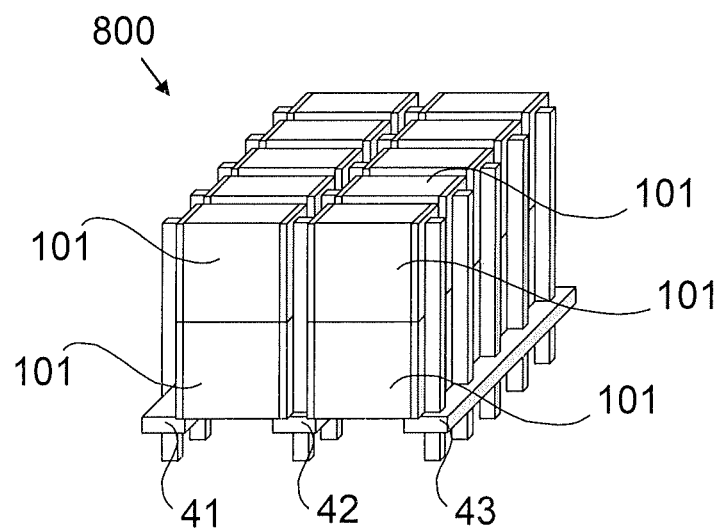

FIG. 7b illustrates an electrical device 800 in accordance with a further example, in which, in contrast to the previously described example, several functional elements 101 are also arranged along the contact strips 41, 42, 43.

In comparison to known electrical devices, the illustrated examples comprise in particular a cost-effective construction and a high current carrying capacity. Furthermore, the electrical devices, in particular in the case of alternative circuit layouts of the contact strips and/or the contact pins, can render possible an extremely low inductance electrical connection.

Our electrical devices and methods are not limited to the examples by the description, but rather this disclosure includes each new feature and each new combination of features. This includes, in particular, each combination of features in the appended claims even if the feature or combination of features is not itself explicitly disclosed in the claims or examples.

The invention claimed is:

1. An electrical device comprising at least one functional element that comprises a ceramic body, on which a first electrical contact layer and a second electrical contact layer are applied to two opposite-lying side faces, respectively, said functional element is arranged between a first contact strip and a second contact strip, a cap arranged over the functional element and the contact strips, wherein 1) the first contact strip and the second contact strip comprise several contact pins, respectively, 2) the cap clamps the contact pins to the first and second contact layers, 3) the first contact layer electrically contacts at least one contact pin of the first contact strip and the second contact layer electrically contacts at least one contact pin of the second contact strip, 4) the functional element is clamped between the first contact strip and the second contact strip by the cap, 5) each of the contact strips comprises a support strip in which the contact pins are fastened, and 6) each contact pin comprises an elongated pin-shaped or rod-shaped body.

2. The device according to claim 1, wherein the support strips comprise metal and/or plastic material.

3. The device according to claim 1, wherein the contact pins of the contact strips protrude through the respective support strip in uniform spacings with respect to one another.

4. The device according to claim 1, wherein the cap covers the functional element and support strips of the contact strips.

5. The device according to claim 1, wherein the cap comprises inclined regions on two opposite-lying inner sides, in which regions the support strips are arranged.

6. The device according to claim 1, comprising several functional elements arranged between the first contact strip and the second contact strip.

7. The device according to claim 6, wherein at least two of the several functional elements are arranged next to one another along the contact strips.

8. The device according to claim 6, wherein at least two of the several functional elements are arranged one on top of another along the contact pins.

9. The device according to claim 6, wherein at least one of the several functional elements contacts precisely one contact pin of the first contact strip and one contact pin of the second contact strip.

10. The device according to claim 1, further comprising at least one additional functional element and a third contact strip, wherein the at least one additional functional element is arranged between the second contact strip and the third contact strip.

11. The device according to claim 1, wherein the at least one functional element is a capacitor element, the ceramic body comprises a layer stack having ceramic layers arranged one on top of another and first and second electrode layers arranged between said ceramic layers, and the electrode layers extend from the two opposite-lying side faces of the ceramic body into the layer stack.

12. The device according to claim 1, wherein the functional element is a varistor element, a PTC thermistor element or an NTC thermistor element.

13. The device according to claim 2, wherein the contact pins of the contact strips protrude through the respective support strip in uniform spacings with respect to one another.

14. The device according to claim 7, wherein at least two of the several functional elements are arranged one on top of another along the contact pins.

15. The device according to claim 1, wherein contact pins are mechanically prestressed and function in a spring-like manner.

* * * * *